United States Patent [19]
Sarofeen

[11] 3,894,710
[45] July 15, 1975

[54] MOLD FORMS COATING SYNTHETIC RESIN LENSES
[76] Inventor: George M. J. Sarofeen, 107 Hanover Ave., Colonial Heights, Va. 23834
[22] Filed: Aug. 29, 1973
[21] Appl. No.: 392,796

[52] U.S. Cl. ............... 249/117; 249/157; 425/808
[51] Int. Cl. ......................................... B29d 11/00
[58] Field of Search ............ 249/117, 118, 57, 163, 249/167; 425/808

[56] References Cited
UNITED STATES PATENTS
| | | | |
|---|---|---|---|
| 1,422,108 | 7/1922 | Kukac | 249/57 |
| 3,136,000 | 6/1964 | Slyk | 249/163 X |
| 3,422,168 | 1/1969 | Bowser | 425/808 X |

Primary Examiner—Roy Lake
Assistant Examiner—DeWalden W. Jones
Attorney, Agent, or Firm—Cameron, Kerkam, Sutton, Stowell & Stowell

[57] ABSTRACT

A method of forming thin wall molds of thermoplastic or thermosetting plastic resin, pressing optical surfaces on the inner walls of said thin wall molds in situ in presses, applying electronic high frequency or ultrasonic energy to soften the mold walls within the press between optically ground and polished dies, cooling said mold walls in situ under pressure in contact with said dies, forming hermetically sealed mold envelopes of said pressings except for a filler canal, filling the mold envelope with polymerizable monomers through said filler canal sealing the filler canal and curing the filled mold envelope to produce an optical lens.

18 Claims, 11 Drawing Figures

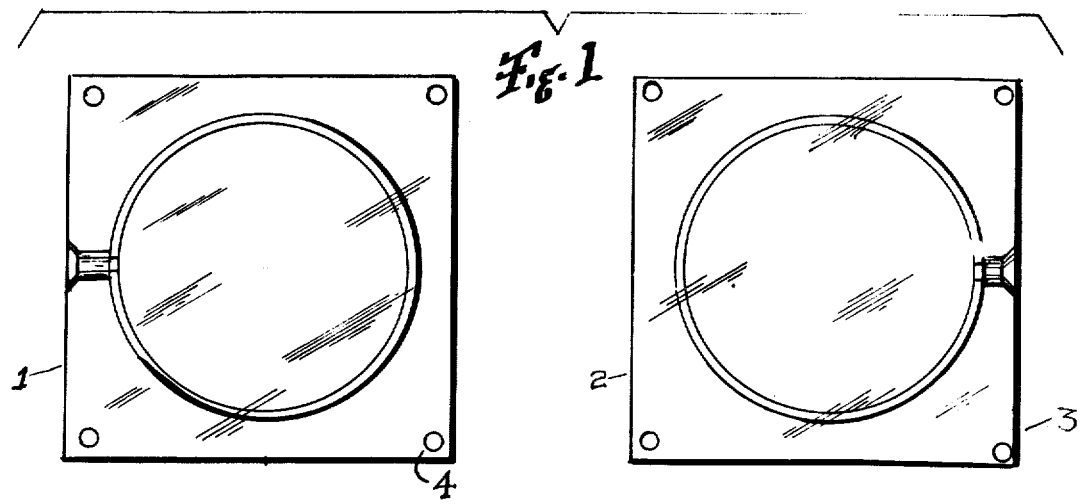
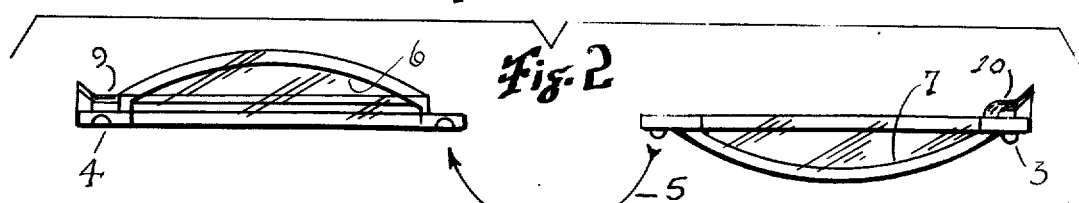
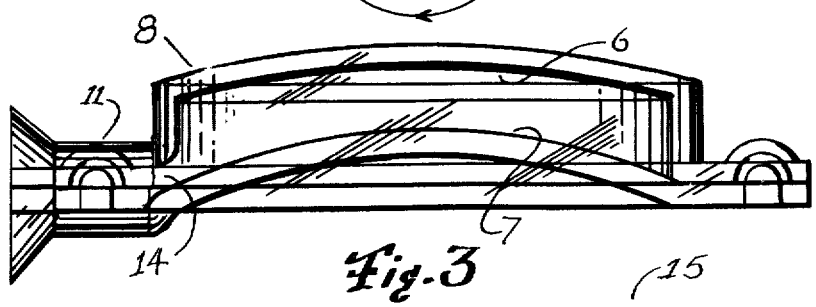
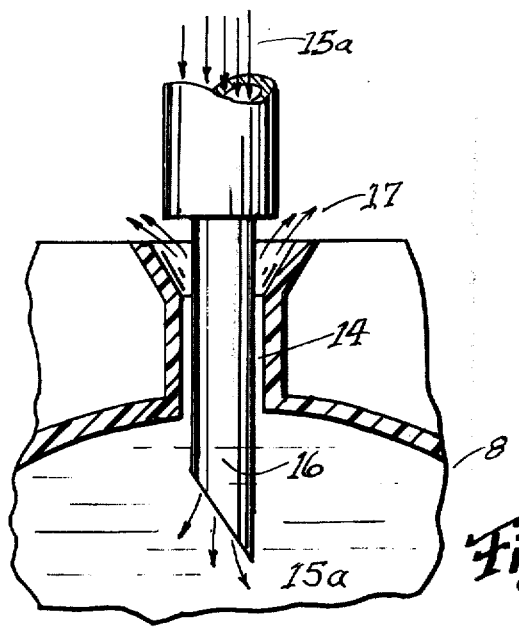
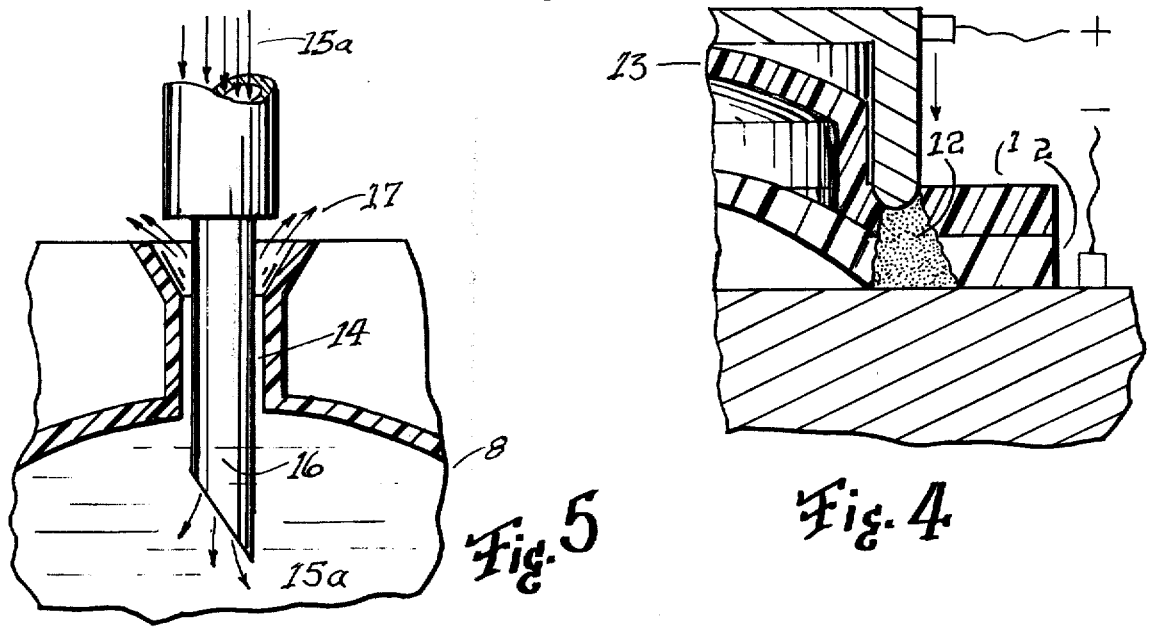

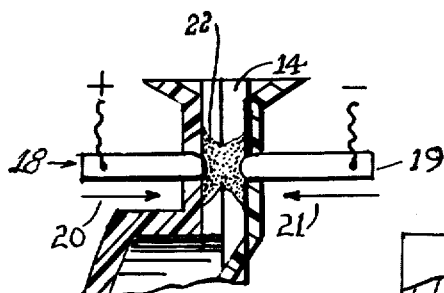
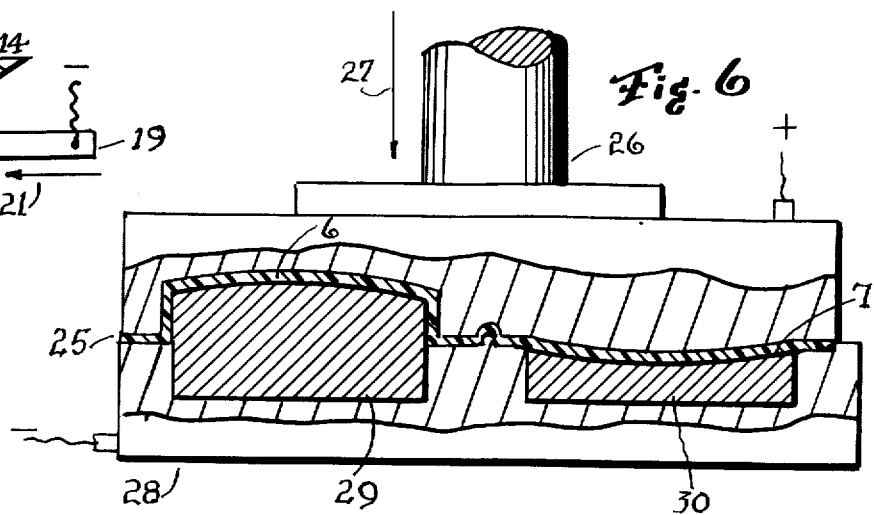
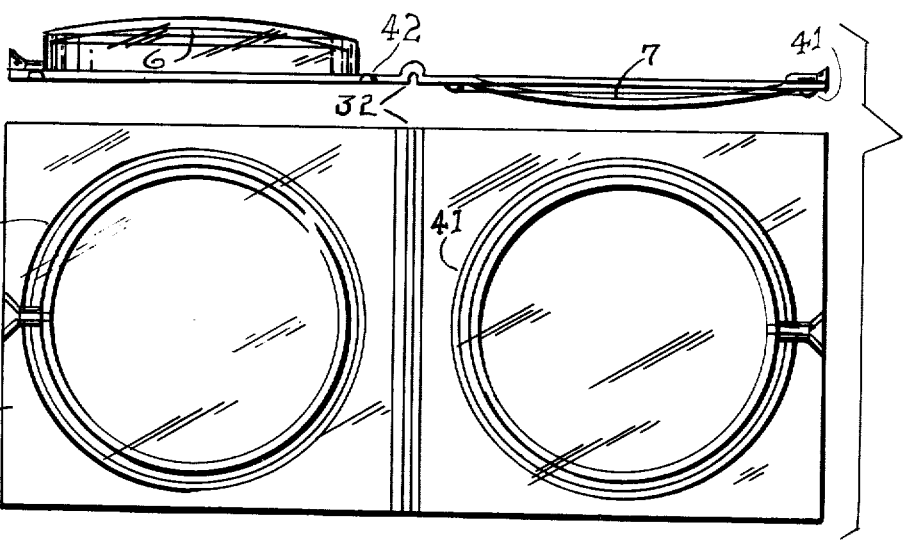
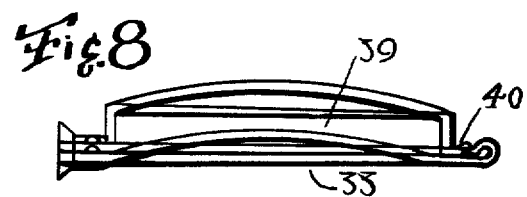
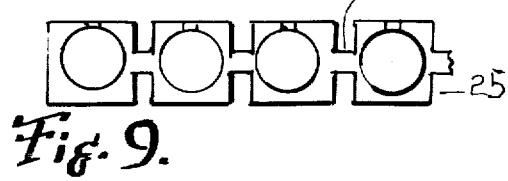
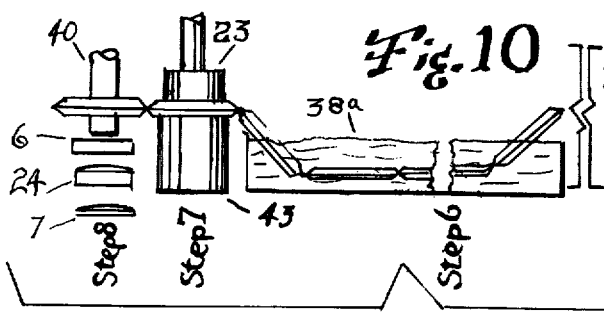
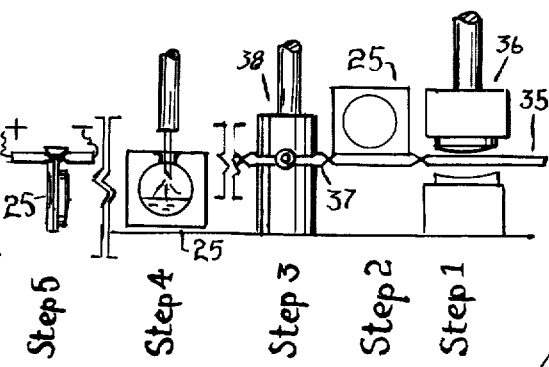

MOLD FORMS COATING SYNTHETIC RESIN LENSES

FIELD OF THE INVENTION

This method is applicable as described herein to producing ophthalmic lenses for eyeglasses and has applicability in the general field of lens production for other purposes.

DESCRIPTION OF THE PRIOR ART

Plastic lenses are cast according to the present art between a pair of glass mold pieces, at least one of which has an optically finished surface prepared to the optical configuration desired to be made on a finished surface of the cast plastic lens. The other mold piece of the pair may be of precisely the curvature and characteristics corresponding to that desired of an opposite side of the lens to be cast, or may be of random configuration which surface is later ground and polished to the desired prescribed optical surface.

In order to cast such a lens from the liquid monomers, of which such lenses are polymerized, it is necessary to mount the mold faces in an annular resilient gasket which is recessed so as to position the mold faces concentrically in seats and is made with a gasket rib extending inwardly all around the inside of the gasket body a short distance to interlie the molds and thereby establish the desired sealed cavity in which to cast a lens and also to establish the thickness and parallelism of the lens.

A plastic lens intended to be cast as a toric lens will necessarily have edges of unequal thickness at different points about the periphery. This requires a thickness control rib of specified thickness corresponding to the variables desired in the edge thickness of the cast lens.

It is well known in the art of casting plastic lenses that a lens having large differences in thickness from center to edge, or large variations in thickness at different points about the periphery will be very troublesome to cure. In cases where such thickness variations exceed a certain minimum amount, the gasket must be removed entirely when the lens has been partially cured in order to allow the lens to shrink without further resistance due to compression of the gasket rib. This is done after gelling but before hardening, so as to allow the cure to be completed without causing premature separation of the lens and molds due to back pressure from the overly compressed annular gasket thickness control rib.

Extremely high internal strains are created within a lens during the final cure period. These occur after gelling and solidification of the monomers and while approaching final polymerization and cure. During this period, the partially polymerized monomers form a tenacious adhesive bond to the glass mold face. This bond can exceed the internal tensile strength of the bond of the glass. There is an undesirable possibility of a defective lens being produced during these final stages of cure when shrinkage due to polymerization causes the lens faces to separate from the mold faces. When this occurs, air is drawn into the mold assembly. Air acts as an inhibitor to polymerization and inhibits further curing of the surfaces. This causes a soft lens to be made, and optical aberrations may also occur in the surface of the lens due to this same premature opening of the mold assembly.

The separation of lens from the mold bodies results from the build-up of back pressure which results from the increasing resistance to compression which builds up in the thickness control rib of the gasket due to shrinkage of the lens casting during polymerization and cure. This reduction in thickness in the rib is as much as 14%. In the case of toric lenses, the lens edge thickness can differ as much as ten to one when measured on ninety degree meridians. It can be seen that 14% shrinkage at the thickest point on the edge may be easily accomodated to at that point by compression of the relatively thick section of the gasket rib, but it may be impossible for the thin portion of the gasket rib to compress an equal distance without creating back pressures of a very high order due to resistance to such massive proportional compression in its thickness.

In cases where the lens and mold are forced apart due to massive resistance to compression at the thinner section of the gasket rib, and where the lens retains its bond to the glass surface of the mold, a catastrophic rupture can occur in a portion of the mold face whereby there may be pulled out bodily from the glass mold surface a substantial chunk of glass.

The monomers and monomer mixtures used may be as described in my U.S. Pat. No. 2,964,501 wherein I disclose many combinations of co-polymers and temperature sequences suitable for making synthetic resin lenses with the methods and style of molds which are the subject of my present invention. A very acceptable lens may be cast using a single monomer, namely, diethylene glycol bis (allyl) carbonate, which forms a hard cross linked polymer when cured. This monomer is best catalyzed with from 3 to 5% by weight of isopropyl percarbonate. The monomer is usually placed in a non-reactive container such as one of stainless steel, glass or polyethylene and a slow speed stirrer provided to agitate the mix. The catalyst is then added to the monomer and mixed until thoroughly dissolved.

Amongst the features which make the above monomer desirable are that the polymer is insoluble in the monomer, that the vapor pressure is relatively low below the boiling point, that there is a gradual and uniform gelling and hardening during polymerization. Such monomers are referred to in my former U.S. Pat. No. 2,964,501 and as described above are desirable as lens casting agents in the application of the prior art of casting lenses. There are serious limitations in the prior art methods, the mold assemblies allow leakage of the monomer while liquid and in the first stages of heating when expansion occurs. Furthermore, there are certain unpredictable contingencies which occur, for example if gelling begins to take place from the center of the monomer mass and then moves outwardly it can be seen that shrinkage occurs overall and air is drawn into the mold through the liquid which lies adjacent to inadequate pressure seal which is common today, spoiling the casting due to the intrusion of air which as stated has an inhibiting effect on the polymerization process as described above.

The combination of the above shortcomings of the prior art result in the existence of a very unpredictable process. Quality and quantity yields vary from batch to batch. This serious set of limitations makes it necessary, in order to maintain a reasonable percentage level of quality yields, to run different types of lenses under different curing heat cycles. Mold assemblies in some cases must be disassembled early to prevent premature opening and the soft lenses then removed from the molds and cure further to questionable hardness in vacuum chambers. In other cases the mold assemblies are removed from the curing ovens, the gaskets removed and then are put back into the curing ovens to allow final shrinkage to take place. Such a procedure results in soft peripheries on the lenses for the edges do not fully polymerize once they have been exposed to air.

These methods of the present art are tedious, clumsy and costly to implement. They result in waste due to the fact that lenses removed while partially cured are extremely sensitive to receiving fingerprints, scratches and other damage during handling. Furthermore, once air has contacted the exposed lens surface or edges it inhibits that area from becoming fully polymerized and cured regardless of the care which may be taken to attempt to finish the curing cycle thereafter.

In addition to the above drawbacks, a lens which has become exposed to air will change color to an undesirable yellow tint which is not acceptable to the trade.

For these reasons, plus the additional reason of the possibility of suffering great economic losses due to these unpredictable drawbacks, there is an urgent need in the field of this invention for reliable systematic methods of casting ophthalmic lenses so that greater precision, speed, economy and reliability of quality yield can be realized without reliance on the skill of the hand operator in removing and curing soft lenses.

SUMMARY OF THE INVENTION

The basic prerequisite of the present invention is the making of lens mold envelopes out of thermoplastic or thermosetting sheet with suitably arranged interior surfaces formed to optical quality and positioned suitably, against which hard resin thermosetting lenses may be cast from polymerizable monomers. The present invention consists basically in the provision of improved sheet-like thin wall construction lens casting molds. Also, the method of forming the mold walls to optical standards and then curing the mold assemblies to produce a finished lens casting therein. These molds made in accordance with my invention are made of such a physical structure that the optically finished internal areas of the mold assembly have adequate rigidity during the first lower temperature part of the curing cycles to provide a true optical surface against which the liquid monomers gel and harden to form into lens elements having optically curved faces which are duplicates of those on the inside of the molds. As the curing temperature is increased and the lens casting increases in hardness, the mold envelope walls becomes more pliable at the elevated temperatures at the latter part of the cycle. This is desirable for the reason that shrinkage of up to 14% in volume occurs in the lens casting as it cures, and the increasingly pliable condition of the walls of the mold envelope as the lens cures allows a limited freedom of movement in the side walls of the mold envelope. This mobility potential of the side walls is needed to allow the inner optical faces of the mold envelope to follow the lens casting faces as shrinkage occurs. My invention thus allows for continuous adhesive contact between the inner mold faces and the surfaces which are being cast on the lens casting. This feature allows unrestricted shrinkage to take place and consequently the lens casting may be fully cured within the mold envelope until fully shrunken, hardened and cured.

Another feature of my invention is the creation of a thin wall mold enelope whereby speed of heat transfer through the walls of the mold is improved. Facility of transfer of heat, both from the temperature controlled curing medium into the mold and through the mold wall from the polymerizing mass of the lens casting into the curing medium is highly desirable. It is a peculiarity of the polymerizing process, especially of the particular monomers of which cast resin lenses are made, that they are first entered into the molds in a liquid form, they then pass through a gel stage to finally harden at high heats into a hard resin. The mechanism of this process can be better understood by reference to my U.S. Pat. No. 2,964,501 wherein I describe mixtures of monomers and catalysts and describe heating cycles for polymerizing the same. The most critical requirement in arranging for proper heat transfer during the curing cycle is during that part of the cycle when the lens casting begins to give off heat as a result of the polymerization process. This is termed exothermic heat, and describes that heat which is generated within the lens casting while curing and which must be drawn off through the walls of the mold and efficiently carried away by the surrounding medium, i.e. air oven or water bath. An uncontrolled build up of exothermic heat within the lens casting will result in varying degrees of damage to the casting. This damage can take the form of creation of a latent weak area in the lens structure which will result in cracking of the lens at some later date. It may also result in complete destruction of the mold and the lens casting during the cure period. Varying degrees of harm can result ranging from the latent defects mentioned to the complete destruction as described. It can readily be seen that my relatively uniform thickness thin wall mold construction provides a minimum heat transfer barrier and a nearly ideal heat transfer condition for uniform heat transfer between all areas of the lens casting and the surrounding medium. Thus, is provided a minimum resistance path through the thin mold wall for introducing heat to begin the polymerization process and later to remove exothermic heat when it is generated.

Furthermore, the completely sealed nature of my mold assembly allows no leakage outwardly nor bleeding of air or other contaminants into the mold during curing to inhibit hardening of the lens casting.

To make my mold envelopes I can use any one of many thermoplastic formulations. I prefer polyvinyl chloride because of its favorable reactivity to dielectric heating, particularly high frequency radio energy. Polyethylene is very suitable and can be utilized very proficiently in sheet form. In fact, almost any thermoplastic material which is not soluble in the monomers used in my invention can be used, such as polycarbonates, nylons, teflon, A.B.S., acrylics, acetate, and other materials which are offered in the market place. In the cases where a lens envelope material will not respond to high frequency dielectric heating, that material may be worked in injection molding type equipment to form the mold envelope sections and these sections may later be heat fused with hot electrodes in presses.

A preferred method of making mold envelopes according to my invention would be to first procure sheet material of polyethylene, or polyvinyl chloride approximately 1/16 of an inch in thickness, then use a conventional vacuum forming machine to roughly preform the mating sides of the mold envelope, then, to place the roughly formed mold sides into conventional high frequency electronic or ultrasonic heating press between optically finished dies to impart optical quality surfaces to the insides of the mold envelope. Then to match and pair up opposite sides of mold envelopes, seal then fill and cure to obtain the lens configurations desired.

Another feature of my invention which obviates a shortcoming of the prior art is the pressing of the softened material under pressure while in a partially molten state and then cooling in situ under pressure. When in the past it has been attempted to reproduce a flawless optical surface to produce a thermoplastic mold, they have poured molten material over a glass mold. This old method is effective except that miniscule surface defects due to the presence of lint or other impurities are spotted throughout the surface. By my method, pressing in soft or molten state and then cooling under pressure in situ all surface irregularities such as gas bubbles are closed up and foreign matter such as lint and the like are driven under the surface leaving an impeccable unbroken surface of optical quality equal to the texture and polished quality of the surface against which the mold walls are pressed.

DESCRIPTION OF THE DRAWINGS

FIG. 1 is a plan view of a pair of mold halves.

FIG. 2 is a view in elevation of the mold halves of FIG. 1.

FIG. 3 is a view in elevation of the mold halves of FIG. 1 and FIG. 2 assembled.

FIG. 4 is a fragmentary view, in elevation, taken on a radian of FIG. 3 when positioned in a heat sealing press.

FIG. 5 is a fragmentary plan view showing a method of filling mold assemblies.

FIG. 5a is a fragmentary view, in elevation, showing a sealing method for filler tube of FIG. 5.

FIG. 6 is a view, in elevation, of a conventional press partly broken away to show how a mold former is pressed.

FIG. 7 are views, in elevation, and plan showing a mold envelope former.

FIG. 8 shows a mold envelope formed of the mold envelope former of FIG. 7.

FIG. 9 shows the chain-like attachments of mold envelopes adapting them to automatic conveying.

FIG. 10 is a simulation of steps in a process for automation of a lens making method.

DESCRIPTION OF THE PREFERRED EMBODIMENTS

In FIG. 1, I have shown in plan view a pair of mold envelope halves 1 and 2. These are molded with alignment nubs 3 on mold half 2 and alignment detents 4 on the mold half 1. The alignment nubs 3 are adapted to fit snugly and precisely into alignment detents 4 so that when the mold halves 1 and 2 are guided together as indicated in FIG. 2 by the arrow 5, with the nubs 3 in position within detents 4 as shown in FIG. 3, the obverse casting surface 6 and the reverse casting surface 7 will lie in optical alignment. I provided for this in the design of the pressing, or injection molding dies not shown, as the case may be, when the mold envelope halves 1 and 2 were heat and pressure formed. Care must be taken to insure that the alignment nubs 3 and detents 4 when engaged are positioned relatively of the center of the obverse and reverse optical casting surfaces so as to cause both obverse and reverse surfaces 6 and 7 to lie in proper axial and optical relationship as may be desired to produce a cast lens of certain required optical characteristics.

When the lens envelope of FIG. 3 is assembled as shown the filler tube halves 9 and 10 come together to form the filler tube 11. This assembly of FIG. 3 is then advanced to a conventional heated die, or electronic or ultrasonic heat fusion sealing press where it is bonded as shown in the fragmentary view, FIG. 4, where the stippled area 12 is meant to show where the material has been caused to flow to form a heat fusion bond. The stippled area 12, between electrodes marked + and —, is formed of heated portions of the rim of the obverse envelope half 1 and the reverse half 2. This heat fused area extends about the total periphery of the raised portion 13 except about the filler tube 11 where the heat fusion seal follows the sides of the filler tube 11 and forms seals to provide a filler canal 14. The upper electrode is annular in shape except for a modification at the filler tube 11 where it is formed to seal both sides of the filler tube 11 leaving the filler canal 14 open as shown in step 5 of FIG. 10. After sealing the mold envelope 8 in this manner it is then filled as shown in FIG. 5. There the monomer mix 15 is ducted through a filling needle 16 as air escapes about the periphery of the needle 16. When the mold envelope 8 is full it is advanced to a conventional heat sealing press as shown in FIG. 5a to seal the filler canal 14. Electrodes 18 marked + and 19 marked — are forced against the outer walls of filler tube 11 as in directions as shown by arrows 20 and 21. Upon energizing the electrodes 18 and 19, a fused area 22, shown as stippled, flows together to seal the filler tube 11. This provides a hermetically sealed mold envelope which contains a catalyzed monomer mix which can be one of the formulation taught in my U.S. Pat. No. 2,964,501. The mold envelope is now prepared for entering a temperature controlled curing media such as a temperature controlled hot air oven or liquid temperature controlled bath where it is kept, for example, a period of 18 hours at 120° Fahrenheit. Upon completion of the heating cycle, the mold envelope is cut by an annular cutter 23 as in a conventional press as shown in step 7 of FIG. 10 and then disassembled as shown in step 8 of FIG. 10 of the drawings, to remove the finished lens casting 24.

The above described method refers to the production of single mold halves such as obverse half 1 and reverse half 2 whereby a myriad number of optical characteristics may be pressed onto the optically prepared casting surfaces, the obverse surface 6 and the reverse surface 7. These mold halves may then be stored in inventory, the types can be, for instance, bifocal types, toric types, spherical types of prism types. Prism is provided for when the optical casting surfaces are tilted out of axial alignment one to another. Other types of optical arrangements may be fabricated. These mold halves, as stated earlier, may be stored in inventory and removed to be matched up to produce desired lens castings of optical characteristics as may be called for by the profession from time to time.

For purposes of further describing the preferred embodiments of my invention, I describe now an application of my invention to automated production. In FIG. 6, I show a sheet of plastic material which has been formed to produce an envelope former 25, which has been formed with the application of pressure and dielectric heating in a conventional electronic heat sealing press 26 which is shown by the arrow 27 as applying force downwardly toward the press platen 28 wherein optically surfaced die inserts 29 and 30 produce the obverse casting surface 6 and the reverse casting surface 7. In FIG. 7, I show an envelope former 31 both in elevation and in plan view wherein I have provided an alignment hinge 32 which is so positioned so as to cause the lens surfaces to fall into exact axial alignment when the envelope former 25 is closed as shown in FIG. 8 to form the lens casting envelope. The envelope 33 is then heat fused about the periphery and filled in a manner similar to that described heretofore. However, in order to cause these lens envelopes to be usable in my automated method they are further modified as shown in FIG. 9, with the provision of a connector tab 34 between the mold envelopes 25 as shown in FIG. 9.

With reference to FIG. 10 of the drawings where I have shown symbolic representations of the steps which I include in my lens manufacturing, I describe my method more fully. In FIG. 10 step 1 shows a sheet of plastic material 35 entering a conventional press 36 wherein is performed the function which is better illustrated in FIG. 6. Here the mold envelope former 25 such as is shown in FIG. 7 number 25 except as modified as in FIG. 9, to cause the mold envelopes to hang together as in a chain.

At Step 2, the mold envelope former 25 is shown as being bent up automatically by suitable means to prepare for peripherally sealing the mold envelope 37 in a conventional heat sealing press 38 as shown in step 3 of FIG. 10, at this position a heat fused seal is accomplished about the periphery of the lens casting cavity 39 at 40 except that the filler canal 14 is left open. At step 4 of FIG. 10, I show a mold envelope 25 individually for illustration only, it is actually still connected within the chain of envelopes as coming off press 38. I show here a mold envelope 25 in the process of filling automatically by suitable means. In step 5, of FIG. 10, I again show an individual mold envelope 25 in the process of sealing the filler tube 11, which sealing process can be better understood by reference to FIG. 5 of the drawings. In step 6 of FIG. 10, I show the chain of filled and sealed mold envelopes as advancing into and through a temperature controlled water bath 38a for curing of the lens monomers. Step 7 of FIG. 10, shows a mold envelope in a conventional die cutting press 43 with the annular cutting die 23 shown cutting through the heat fused seal area 12 to allow separation of the obverse element 6 and the reverse element 7 from the finished casting 24 whereby in step 8 of FIG. 10 a plunger 40 pushes out the finished lens casting 24. In this way I provide for a continuous production of all kinds of hard resin cast lenses in many configurations in the same production line. An automatic device for changing the optically surfaced die inserts 29 and 30 in a press of conventional form will allow the production of many different lenses of varied optical character, all running sequentially through the automated lens casting line one after the other without need to treat each type of lens specially as to curing heats. The sealed nature of the lens casting envelopes guarantees against the occurrence of many common defects such as lint marks, air spoilage, shrinkage, damage to glass mold faces and other shortcomings of the present art. Furthermore, my invention requires that only one mold die insert be made for each curve regardless of the number of lenses scheduled each day per optical surface. Very close attention can be given to the quality of the single mold die insert as against the present practice of having to make and monitor a mold die for every lens to be produced. In my method, all curves for a given curve will be pressed the same. Under present methods such curves can vary because glass mold dies must be made in large quantities for each curve and they will differ.

In FIGS. 7 and 8, I show an auxiliary mold alignment feature in the form of an annular projection 41 snd an annular detent 42. The annular projection 41 and annular detent 42 cooperate to insure axial alignment of the mold halves when matched as shown in FIG. 8.

While a preferred form of the invention has been illustrated in the drawings and discussed above, it should be adequately clear that considerable modifications may be made thereto without departing from the principles of the invention. Therefore, the foregoing should be considered in an illustrative sense rather than a limiting sense, and accordingly the extent of this invention should be limited only by the spirit and scope of the claims appended hereto.

What is claimed is:

1. A mold envelope for casting hard resin castings from polymerizable monomers therein, comprising a one-piece mold form, the inner configuration of which is adapted to form a molding cavity in the form and shape of the casting desired to be cast, said mold form having an outer skin of relatively thin formed, sheet-like thermoplastic material.

2. A mold envelope according to claim 1 wherein said form includes a first half and a second half adapted to form and shape a casting therebetween, alignment nubs being provided on one of said halves and detents being provided on the other of said halves to insure axial alignment of the mold halves.

3. A mold according to claim 1 wherein said form comprises a first half and a second half, said halves being sealed substantially completely about their periphery and a filler canal extending from the sealed halves and opening into an internal molding cavity formed by said sealed halves.

4. A mold according to claim 1 wherein said mold form includes means for aligning opposite-facing casting surfaces.

5. A mold according to claim 1 wherein said mold form includes two halves and an alignment hinge joining said halves.

6. A mold according to claim 1 including a first obverse internal casting surface and a second reverse casting surface, said surfaces being finished to form optical curves and surfaces on the casting and means for axially aligning said casting surfaces to form the molding cavity for casting a lens.

7. A mold according to claim 6 wherein said thermoplastic material is a polyvinyl chloride, polyethylene, polycarbonate, nylon, teflon, acrylic, acetate or A.B.S.

8. A mold envelope for casting lenses comprising a mold form of one-piece construction, an included cavity within said mold wherein a lens may be cast by polymerization of monomeric materials, at least a portion of the inner wall area of said included cavity being formed to optical characteristics.

9. A mold as set forth in claim 8 having a filler opening extending from the included cavity for introducing liquid monomers into said included cavity.

10. A mold set forth in claim 8 having fused portions whereby said included cavity is sealed hermetically.

11. A mold as set forth in claim 1 wherein the walls forming said cavity are of substantially uniform thickness.

12. A mold as set forth in claim 8 having a plurality of optically prepared surfaces on the inner walls of said included cavity.

13. A mold as set forth in claim 8 having optical surfaces pressed onto the walls of said included cavity in complementary relationship whereby a lens may be formed by polymerizing a monomeric material therebetween.

14. A mold as set forth in claim 13 including means for axially aligning the complementary optical surfaces of the mold form.

15. A mold as in claim 8 wherein at least a portion of the inner walls of the included cavity are formed with heat induced in the mold wall material by the application of high frequency energy.

16. A mold as in claim 1 wherein at least a portion of the inner walls of the included cavity are formed with heat induced in the mold wall material by the application of ultrasonic energy.

17. A mold as in claim 1 formed of thermoplastic material.

18. A mold as in claim 1 formed of thermoplastic material having rigid properties at room temperature and selected from the group comprising polyvinyl chloride, polyethylene, polycarbonate, nylon, teflon, acrylic, acetate and A.B.S.

* * * * *